(12) United States Patent
Kamath

(10) Patent No.: US 9,561,884 B2
(45) Date of Patent: Feb. 7, 2017

(54) DOUBLE-WALL CLOSURE

(71) Applicant: Closure Systems International Inc., Indianapolis, IN (US)

(72) Inventor: Ramesh Kamath, Carmel, IN (US)

(73) Assignee: Closure Systems International Inc., Lake Forest, IL (US)

( * ) Notice: Subject to any disclaimer, the term of this patent is extended or adjusted under 35 U.S.C. 154(b) by 84 days.

(21) Appl. No.: 14/541,972

(22) Filed: Nov. 14, 2014

(65) Prior Publication Data

US 2015/0096989 A1     Apr. 9, 2015

Related U.S. Application Data

(63) Continuation of application No. 13/458,463, filed on Apr. 27, 2012, now abandoned.

(60) Provisional application No. 61/480,740, filed on Apr. 29, 2011.

(51) Int. Cl.
| | |
|---|---|
| *B65D 41/04* | (2006.01) |
| *B29C 43/36* | (2006.01) |
| *B29C 43/18* | (2006.01) |
| *B29K 101/12* | (2006.01) |
| *B29L 31/56* | (2006.01) |

(52) U.S. Cl.
CPC ........... *B65D 41/0428* (2013.01); *B29C 43/18* (2013.01); *B29C 43/361* (2013.01); *B65D 41/045* (2013.01); *B65D 41/0485* (2013.01); *B29K 2101/12* (2013.01); *B29L 2031/565* (2013.01)

(58) Field of Classification Search
CPC ............ B65D 41/0428; B65D 41/0485; B65D 41/045;B65D 41/023; B65D 41/0407; B65D 41/04; B65D 41/0435; B29C 43/18; B29C 43/361
USPC ........ 220/304, 291, 288; 215/344, 343, 341, 215/316, 354
See application file for complete search history.

(56) References Cited

U.S. PATENT DOCUMENTS

| | | | | |
|---|---|---|---|---|
| 1,937,492 | A | * | 11/1933 | Merolle ............... B65D 41/045 215/329 |
| 3,203,571 | A | * | 8/1965 | Plunkett ........................ 215/344 |
| 4,117,945 | A | * | 10/1978 | Mumford ............. B65D 50/046 215/216 |
| 4,351,442 | A | * | 9/1982 | Summers ............. B65D 50/046 215/216 |
| 4,721,219 | A | * | 1/1988 | Dullabaun et al. ........... 215/274 |
| 4,793,505 | A | | 12/1988 | Towns et al. |
| 5,800,764 | A | * | 9/1998 | Smeyak et al. ............... 264/268 |
| 6,533,136 | B1 | | 3/2003 | Willingham |
| 7,021,478 | B1 | * | 4/2006 | Hock .............................. 215/349 |
| 7,635,071 | B1 | | 12/2009 | Montgomery et al. |

(Continued)

OTHER PUBLICATIONS

International Search Report and Written Opinion for corresponding PCT application No. PCT/US2012/035422 mailed Jul. 6, 2012.

*Primary Examiner* — Robert J Hicks
(74) *Attorney, Agent, or Firm* — Nixon Peabody LLP

(57) ABSTRACT

A composite closure having a double-wall configuration facilitates convenient use by consumers, and permits in-shell formation of a sealing liner. The closure includes an outer closure cap having inner and outer annular skirt portions arranged in concentric relationship with each other. The closure includes a sealing liner formed in the closure cap at the inside surface of the top wall portion of the closure cap. A method of compression-molding the sealing liner is provided.

7 Claims, 2 Drawing Sheets

(56) References Cited

U.S. PATENT DOCUMENTS

| | | |
|---|---|---|
| 7,694,835 B1 * | 4/2010 | Montgomery ............... 215/329 |
| 8,360,257 B2 | 1/2013 | Sebille et al. |
| 2002/0185464 A1 | 12/2002 | Luker |
| 2004/0155007 A1 | 8/2004 | Hearld et al. |
| 2011/0017741 A1 * | 1/2011 | Sprishen ...................... 220/288 |
| 2011/0052768 A1 | 3/2011 | Py et al. |
| 2012/0031905 A1 | 2/2012 | Perez et al. |

* cited by examiner

DOUBLE-WALL CLOSURE

CROSS-REFERENCE TO RELATED APPLICATION

This application claims priority of U.S. patent application Ser. No. 13/458,463, filed Apr. 27, 2012, which claims priority of Provisional Application Ser. No. 61/480,740, filed Apr. 29, 2011, the disclosure of which is incorporated herein by reference.

TECHNICAL FIELD

The present invention relates generally to closures molded from polymeric materials for use on associated bottles and like containers, and more particularly to a closure having a double-wall configuration, facilitating convenient use by consumers, with the closure configured to permit in-shell formation of a sealing liner.

BACKGROUND OF THE INVENTION

Plastic closures formed from suitable polymeric materials have met with widespread acceptance in the marketplace, such as for use in bottles and like containers, including use on both carbonated and non-carbonated beverages. Closures of this nature can be efficiently formed by compression molding or injection molding.

For some applications, it is desirable to provide a closure of this nature with a double-wall configuration, that is, a configuration including an inner skirt portion for engagement with an associated container, and an outer skirt portion to facilitate convenient manipulation by consumers. Heretofore, such double-wall closures have typically been used in conjunction with induction-heated foil seals for sealing the contents of the associated container. However, experience has shown that consumers can find such induction seals difficult to manipulate and remove, particularly older consumers who may lack manual dexterity.

Additionally, the process of heating the foil seal to adhere to the container can undesirably result in distortion of the top sealing surface of the container. This can negatively impact resealing of the container, upon reapplication of the closure thereto, particularly if the container is not oriented in an upright position.

Moreover, beverage bottlers have found that such foil seal liners can be difficult to sterilize, and cannot be readily sterilized online in aseptic applications. Because the foil liner requires a secondary heating system to create the hermetic seal between the liner and the associated container, use of such foil liners undesirably adds to the cost of the bottling process.

The present invention contemplates a double-wall container configuration which facilitates convenient use by consumers, and which is configured to permit in-shell formation of a sealing liner, obviating the need for a typical induction foil seal.

SUMMARY OF THE INVENTION

A closure embodying the principles of the present invention has been configured to permit efficient in-shell compression molding of a sealing liner adjacent the inside surface of a top wall portion of the closure. Different liner profiles can be efficiently formed, depending upon the specific application. The configuration of the closure facilitates convenient use by consumers, while desirably avoiding the need for an induction foil seal or the like.

In accordance with the illustrated embodiment, the present closure includes a closure cap having a top wall portion (sometimes referred to as a top panel), a first outer annular skirt portion, and a second, inner annular skirt portion. The first and second skirt portions (sometimes referred to as sidewalls) depend from the top wall portion in generally concentric relationship with each other, with the inner skirt portion being positioned inwardly of the outer skirt portion.

The inner skirt portion includes at least one helical, internal thread formation on an inside surface of the inner skirt portion for engagement with an external thread formation on the associated container. To facilitate convenient manipulation by consumers, the outer skirt portion extends further from the top wall portion then the inner skirt portion, and can have an outer surface which tapers inwardly in a directional away from the top wall portion to facilitate grasping of the closure.

In accordance with the present invention, a sealing liner is provided on the inside surface of the top wall portion within the inner skirt portion. The sealing liner is spaced inwardly from the inside surface of the inner skirt portion, and comprises a central portion, and a relatively thick, annular sealing portion surrounding the central portion for sealing engagement with the associated container.

In the illustrated embodiment, the inner skirt portion has a generally cylindrical outer surface, and the outer skirt portion has an inner surface which is generally cylindrical and is concentric with the outer surface of the inner annular skirt portion. The outer skirt portion can be provided with a plurality of circumferentially spaced, vertically extending ribs on the inner surface of the outer skirt portion for enhancing the rigidity of the outer skirt portion.

In accordance with the present invention, in-shell formation of a compression-molded sealing liner is contemplated. The method of making a composite closure in accordance with the present invention comprises the steps of providing a closure cap having a top wall portion, a first outer annular skirt portion, and a second, inner annular skirt portion, with the first and second skirt portions depending from the top wall portion in generally concentric relationship with each other. The inner annular skirt portion includes an internal thread formation, which desirably acts to guide/locate the liner-forming tooling during formation of a sealing liner.

The present method further provides depositing a quantity of molten liner-forming material into the closure cap adjacent the top wall portion.

Liner formation is effected by providing a liner-forming tooling assembly, including an outer sleeve, and an inner plunger positioned within the outer sleeve. Compression molding of a sealing liner in the closure cap adjacent to the top wall portion is effected by advancing the liner-forming tooling assembly into the closure cap. This aspect of the present method includes first advancing the outer sleeve of the tooling assembly into the skirt portion so that the outer sleeve engages the internal thread formation, and thereafter is further moved into engagement with the top wall portion. The inner plunger is thereafter advanced through the outer sleeve to compression mold the liner-forming material to form the sealing liner adjacent the top wall portion. By this formation method, wherein the outer sleeve is advanced into engagement with the top wall portion, the sealing liner is formed so that it is spaced inwardly from the inside surface of the inner, annular skirt portion, with the geometry of the sealing liner being concentric with the internal thread formation. The sealing liner can be formed with a central portion, and a relatively thick, annular sealing portion surrounding the central portion. The outer sleeve of the tooling assembly is configured to have very slight inference to pilot off the internal thread formation such that the resulting sealing liner formed by the inner plunger is concentric with the closure internal thread formation, resulting in having the sealing liner concentric with the external thread formation of the container to which the closure is applied.

By the present method, the inside skirt portion of the closure cap is used as a guiding surface for the in-shell liner tooling, thus permitting the inside surface of the top wall portion of the closure cap to have a sealing liner formed thereon. Notably, the profile of the sealing liner can be customized to meet the sealing needs of the particular closure/container package, depending upon the processing conditions, such as aseptic, hot fill, cold fill, or ultraviolet (UV) light sterilized.

Notably, the elimination of the typical induction foil seal facilitates sterilization online under both ESL (extended shelf life) and aseptic filling conditions. The closures desirably create a hermetic seal when applied on the containers, without resort to any secondary operation, such as induction sealing. The liner profile and material do not negatively affect the bottle finish quality, and provide the benefit of sealing existing imperfections in the container finish.

The present closure desirably provides easy access to the package contents for consumers, with the sealing liner profile and material providing good resealing characteristics when the closure is reapplied to the container. The closures formed in accordance with the present invention can be used without negatively impacting productivity (i.e. bottling line speeds), since resort to induction sealing and the like is avoided. Use of in-shell formed sealing liners has been found to be less expensive than typical induction foil seal liners, and the shell liners are easier to sterilize. Because the shell liners are bonded to the inside surface of the top wall closure and thus become an integral part of the closure, problems such as induction foil seals falling off during closure handling are desirably avoided.

Other features and advantages will become readily apparent from the following detailed description, the accompanying drawings, and the appended claims.

DETAILED DESCRIPTION

Figure 1:
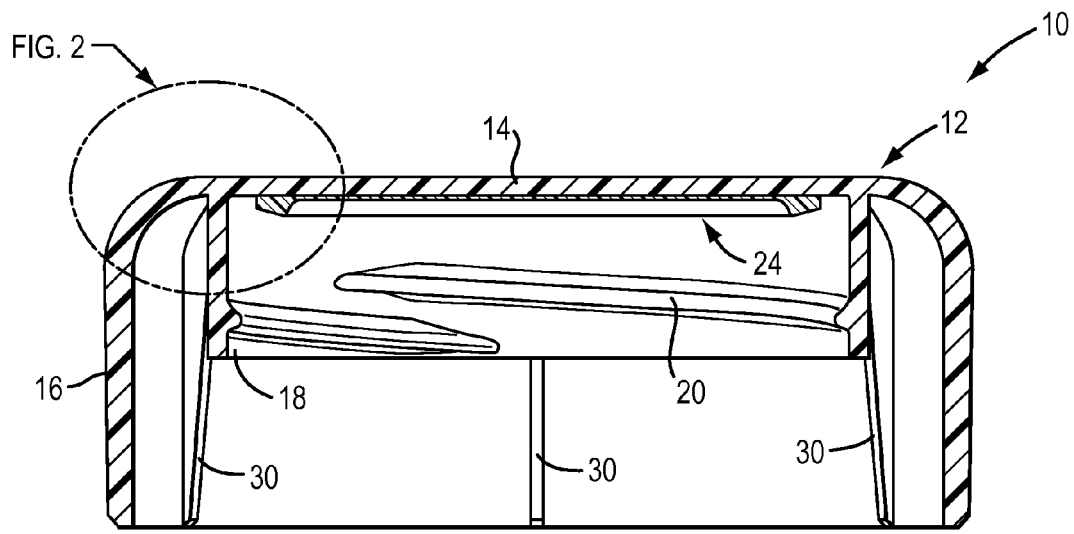
FIG. 1 is a cross-sectional view of a double-wall closure embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

The present invention is directed to a double-wall closure, that is, a closure having inner and outer annular skirt portions. The closure is configured to facilitate convenient use on associated bottles and like containers, and is desirably configured to facilitate formation of a compression-molded sealing liner at an inside surface of a top wall portion of the closure. The present invention further contemplates a method of forming a composite closure, including compression molding of a sealing liner within a closure cap having a double-wall configuration.

With reference to the drawings, herein is illustrated a double-wall closure 10 embodying the principles of the present invention. In the illustrated embodiment, closure 10 is configured as a composite closure, in that the closure comprises an outer closure cap, formed from suitable polymeric material such as polypropylene, polyethylene, copolymers, or the like, and an inner sealing liner, such as formed from ethylene vinyl acetate (EVA) or thermoplastic elastomer (TPE) for sealing engagement with an associated container. This type of composite closure construction is particularly advantageous in that the outer closure cap or shell can be configured to exhibit the desired strength and performance characteristics required for a wide variety of applications, while a relatively soft sealing liner can be provided for the desired sealing engagement with an associated bottle or container.

In accordance with the illustrated embodiment, closure 10 comprises an outer closure cap or shell 12 having a top wall portion 14. In accordance with the present invention, closure cap 12 includes a first, outer annular skirt portion 16, and a second, inner annular skirt portion 18, with the first and second skirt portions depending from the top wall portion 14 in generally concentric relationship with each other. The inner skirt portion 18 is positioned inwardly of the outer skirt portion 16, with the outer skirt portion 16 extending substantially further from the top wall portion 14 than the inner skirt portion 18. In the preferred form, the outer skirt portion has an outer surface which tapers inwardly in a direction away from top wall portion 14 to facilitate grasping of the closure 10.

As illustrated, the inner skirt portion 18 includes at least one helical internal thread formation 20 on the inside surface of the inner skirt portion. The helical thread formation 20 is configured for engagement with an external thread formation on an associated container.

Figure 2:
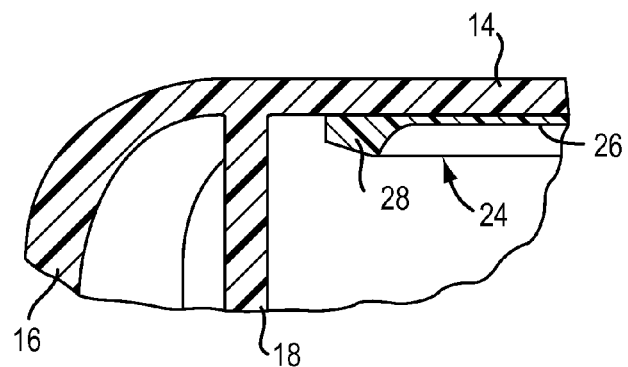
FIG. 2 is an enlarged, cross-sectional view taken at Detail A of FIG. 1.
Figure 3:
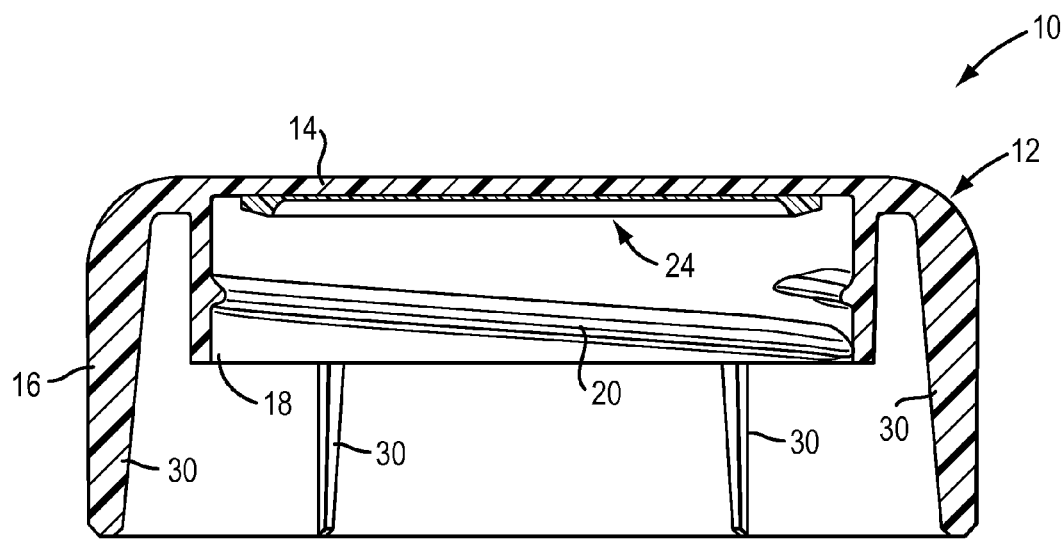
FIG. 3 is a further cross-sectional view of the present double-wall closure.

In accordance with the present invention, a sealing liner 24 is provided on the inside surface of the top wall portion 14 of the closure cap 12, within the inner skirt portion 18. The sealing liner 24 is spaced inwardly from the inside surface of the inner skirt portion 18, and preferably comprises a relatively thin, central portion 26, and a relatively thick, annular sealing portion 28, surrounding the central portion 26, for sealing engagement with the associated container (see FIG. 2).

In the illustrated embodiment, the inner skirt portion 18 has a generally cylindrical outer surface, and the outer skirt portion 16 has an inner surface which is generally cylindrical and is concentric with the outer surface of inner annular skirt portion 18. As illustrated, the outer skirt portion 16 can be provided with a plurality of circumferentially spaced, vertically extending ribs 30 on the inner surface of the outer skirt portion 16 for enhancing the rigidity of the outer skirt portion.

As noted, the present closure 10 is configured to include an integral, sealing liner 24, thus desirably avoiding the need for use of an associated induction-heated foil for effecting sealing engagement with an associated container. Experience has shown that use of sealing liners formed in situ, that is, by compression molding at the inside surface of the top wall portion of the closure cap, is less expensive than the typical induction foil seal liners, with in shell formation further facilitating sterilization of the closures, as required for some applications.

Figure 4:
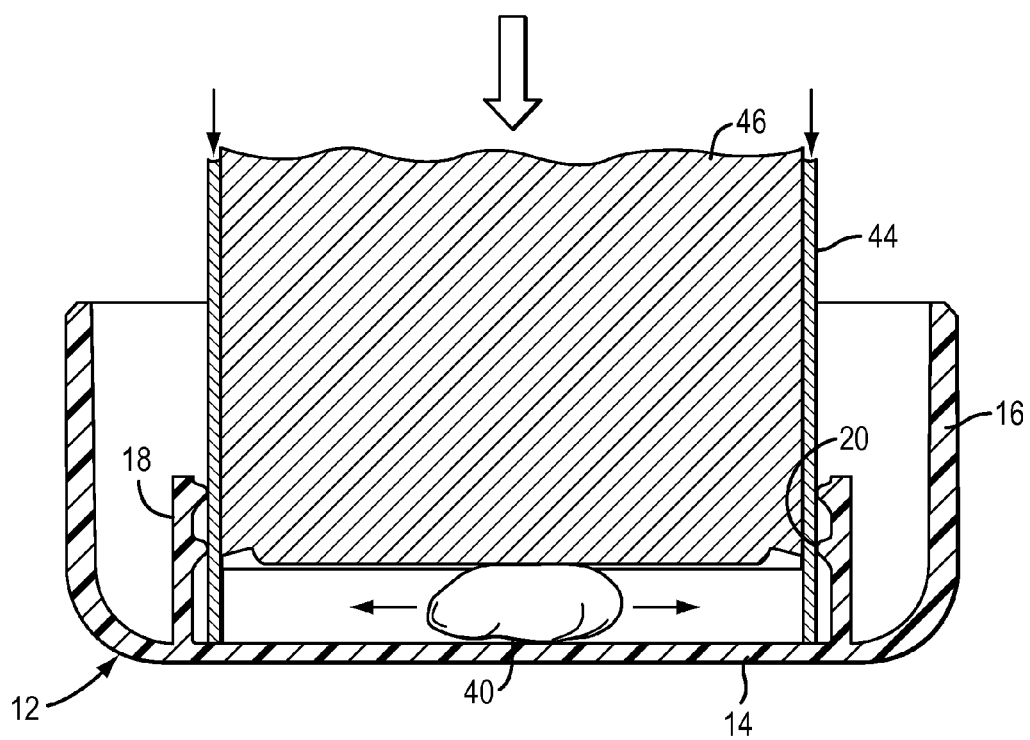
FIG. 4 is a diagrammatic view illustrating a method of making a composite closure having a double-wall, in accordance with the present invention.

In accordance with the present invention, FIG. 4 illustrates the present method of making a composite closure, including a double-wall outer closure cap. As shown, the outer closure cap 12 is ordinarily positioned in an upwardly opened configuration, for liner formation. A predetermined quantity of molten, liner-forming material 40 is then deposited in the closure cap 12 adjacent the top wall portion 14.

A liner-forming tooling assembly is provided, which includes an outer sleeve 44, and an inner liner-forming plunger 46 positioned within the outer sleeve 44. The sealing liner 24 of the closure is compression molded in the closure cap 12, adjacent the top wall portion 14 thereof, by advancing the liner-forming tooling assembly into the closure cap. Notably, liner formation includes advancing the outer sleeve 44 into the inner skirt portion 18 of the closure cap so that the outer sleeve engages the internal thread formation 20, and thereafter engages and seals against the inside surface of top wall portion 14. Formation in this manner desirably acts to guide and locate the outer sleeve 44 using the inside diameter of thread formation 20, thus resulting in liner geometry which is concentric with the thread formation.

Liner formation is further effected by advancing the inner plunger 46 against the liner-material 40, after the outer sleeve 44 has engaged the inside surface of top wall portion 14, thus essentially sealing the region so that the liner-forming material 40 is compression-molded to form sealing liner 24. Withdrawal of the liner-forming tooling assembly from within the closure cap 12 completes liner formation.

Preferably, the liner-forming components are configured so that there is a very slight interference between the outer sleeve 44 and the internal thread formation 20, so that the liner-forming tooling can "pilot off" and be guided by the thread formation. This results in formation of a liner by the inner plunger which is concentric with the closure threads, resulting in the sealing liner 24 being concentric with the thread formation of an associated container for enhanced application and sealing.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A closure for an associated container, comprising:
   a closure cap having a top wall portion, a first outer annular skirt portion, and a second, inner annular skirt portion, said first and second skirt portions depending from said top wall portion in generally concentric relationship with each other, said inner skirt portion being positioned inwardly of said outer skirt portion,
   said inner skirt portion having at least one helical, internal thread formation on an inside surface of said inner skirt portion for engagement with an external thread formation on the associated container, said inner skirt portion having a generally cylindrical outer surface,
   said outer skirt portion extending further from said top wall portion than said inner skirt portion, and having an inner surface which is generally cylindrical and concentric with said outer surface of said inner skirt portion, and
   a sealing liner positioned on the inside surface of said top wall portion within said inner skirt portion, said sealing liner being spaced inwardly from the inside surface of said inner, annular skirt portion, and being concentric with said internal thread formation.

2. A closure for an associated container in accordance with claim 1, wherein
   said sealing liner comprises a central portion, and a relatively thick, annular sealing portion surrounding said central portion for sealing engagement with said associated container.

3. A closure for an associated container in accordance with claim 1, wherein
   said outer skirt portion has a plurality of circumferentially spaced, vertically extending ribs on the inner surface of the outer skirt portion.

4. A method of making a composite closure, comprising the steps of:
   providing a closure cap having a top wall portion, a first outer annular skirt portion, and a second, inner annular skirt portion, said first and second skirt portions depending from said top wall portion in generally concentric relationship with each other, said inner skirt portion being positioned inwardly of said outer skirt portion, said inner skirt portion having at least one helical, internal thread formation on an inside surface of said inner skirt portion, said outer skirt portion extending further from said top wall portion than said inner skirt portion;
   depositing a quantity of molten liner-forming material into said closure cap adjacent said top wall portion;
   providing a liner-forming tooling assembly, including an outer sleeve, and an inner plunger positioned within said outer sleeve; and
   compression molding a sealing liner in said closure cap adjacent said top wall portion by advancing said liner-forming tooling assembly into said closure cap, including advancing said outer sleeve into said inner skirt portion so that said outer sleeve engages said internal thread formation and thereafter engages said top wall portion, and thereafter advancing said inner plunger to compression mold said liner-forming material to form said sealing liner adjacent said top wall portion, with the geometry of said sealing liner being concentric with and spaced inwardly from said internal thread formation.

5. A method of making a composite closure in accordance with claim 4, including
   forming said sealing liner with a central portion, and a relatively thick, annular sealing portion surrounding said central portion.

6. A manufacturing system for manufacturing a closure with an inner sealing liner, comprising:
   a closure comprising a closure cap having a top wall portion, a first outer annular skirt portion, and a second inner annular skirt portion, said first and second annular skirt portions depending from said top wall portion in generally concentric relationship with each other, said inner skirt portion being positioned inwardly of said outer skirt portion,
   said inner skirt portion having at least one helical, internal thread formation on an inside surface of said inner skirt portion for engagement with an external thread formation on the associated container, said inner skirt portion having a generally cylindrical outer surface,
   said outer skirt portion extending further from said top wall than said inner skirt portion, and having an inner surface which is generally cylindrical and concentric with said outer surface of said inner skirt portion, said closure including a sealing liner positioned on the inside surface of said top wall portion within said inner skirt portion, said sealing liner being spaced inwardly from the inside surface of said inner, annular skirt portion, and being concentric with said internal thread formation, said system including a cylindrical sleeve guided and located within said internal thread formation of said inner skirt portion engageable with said inside surface of said top wall portion, and a plunger moveable axially within said cylindrical sleeve and concentric with said inner and outer skirt portions.

7. A manufacturing system for manufacturing a closure with an inner seal in accordance with claim 6, wherein said sealing liner comprises a central portion, and a relatively thick, annular sealing portion surrounding said central portion for sealing engagement with said associated container.

\* \* \* \* \*